(12) United States Patent
Tahnoose et al.

(10) Patent No.: US 9,349,224 B2
(45) Date of Patent: May 24, 2016

(54) SYSTEMS AND METHODS FOR VEHICLE STATUS NOTIFICATION

(71) Applicant: GM GLOBAL TECHNOLOGY OPERATIONS LLC, Detroit, MI (US)

(72) Inventors: Marc J. Tahnoose, West Bloomfield, MI (US); Michael E. McGuire, Milford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 150 days.

(21) Appl. No.: 14/044,003

(22) Filed: Oct. 2, 2013

(65) Prior Publication Data

US 2015/0094877 A1    Apr. 2, 2015

(51) Int. Cl.
*G07C 5/00*    (2006.01)
*B60W 50/00*   (2006.01)
*H04W 12/00*   (2009.01)

(52) U.S. Cl.
CPC ............... *G07C 5/008* (2013.01); *B60W 50/00* (2013.01); *H04W 12/00* (2013.01)

(58) Field of Classification Search
CPC ........................................................ G07C 5/008
See application file for complete search history.

(56) References Cited

U.S. PATENT DOCUMENTS

| 7,321,814 | B2* | 1/2008 | Kanda et al. | 701/29.6 |
| 8,255,586 | B2* | 8/2012 | Choi | G07C 5/008 710/15 |
| 8,836,477 | B2* | 9/2014 | Hiramine | B60R 25/24 180/287 |
| 8,983,719 | B2* | 3/2015 | Ukai | G06F 17/00 701/1 |
| 2009/0261969 | A1* | 10/2009 | Kobayashi | 340/539.11 |
| 2013/0144471 | A1* | 6/2013 | Min | G06F 17/00 701/2 |
| 2013/0211623 | A1* | 8/2013 | Thompson et al. | 701/2 |

* cited by examiner

*Primary Examiner* — Todd Melton
(74) *Attorney, Agent, or Firm* — Ingrassia Fisher & Lorenz, P.C.

(57) ABSTRACT

Methods and apparatus are provided for notifying a user of a condition of a vehicle. The method includes receiving sensor data from one or more sensors associated with one or more systems of the vehicle. The one or more sensors observe conditions associated with the one or more systems of the vehicle. The method includes receiving a preference for notifications from a user of the vehicle. The method further includes generating at least one notification based on the preference and the sensor data, and communicating the at least one notification to a device of the user.

14 Claims, 3 Drawing Sheets

SYSTEMS AND METHODS FOR VEHICLE STATUS NOTIFICATION

TECHNICAL FIELD

The present disclosure generally relates to vehicles and more particularly relates to systems and methods for notifying an operator of the vehicle regarding a status of a vehicle system.

BACKGROUND

Most vehicles include a number of vehicle systems, such as powertrain systems, body systems, for example, door lock and liftgate systems, interior systems, for example, sunroof systems, heating and cooling systems, etc. The proper operation of these systems is important to ensure the proper operation of the vehicle. For example, if the powertrain system includes an engine that is powered by fuel, if the fuel level is low, the vehicle may not be able to start properly. Further, one or more conditions associated with a system of the vehicle may be unknown to the operator of the vehicle, in cases where the operator is at a location separate from the vehicle.

Accordingly, it is desirable to provide systems and methods to notify an operator of a status of a vehicle system. Furthermore, other desirable features and characteristics of the present invention will become apparent from the subsequent detailed description and the appended claims, taken in conjunction with the accompanying drawings and the foregoing technical field and background.

SUMMARY

A method is provided for notifying a user of a condition of a vehicle. The method includes receiving sensor data from one or more sensors associated with one or more systems of the vehicle. The one or more sensors observe conditions associated with the one or more systems of the vehicle. The method includes receiving a preference for notifications from a user of the vehicle. The method further includes generating at least one notification based on the preference and the sensor data, and communicating the at least one notification to a device of the user.

An apparatus is provided for notifying a user of a condition associated with a system of a vehicle. The apparatus includes a sensor that observes a condition associated with a system of the vehicle and generates sensor data based on the observed condition. The apparatus also includes a user input device for receiving a preference for notification from the user, and a communication device to communicate a notification to a device associated with the user. The apparatus includes a control module that generates the notification for communication by the communication device based on the preference and the sensor data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
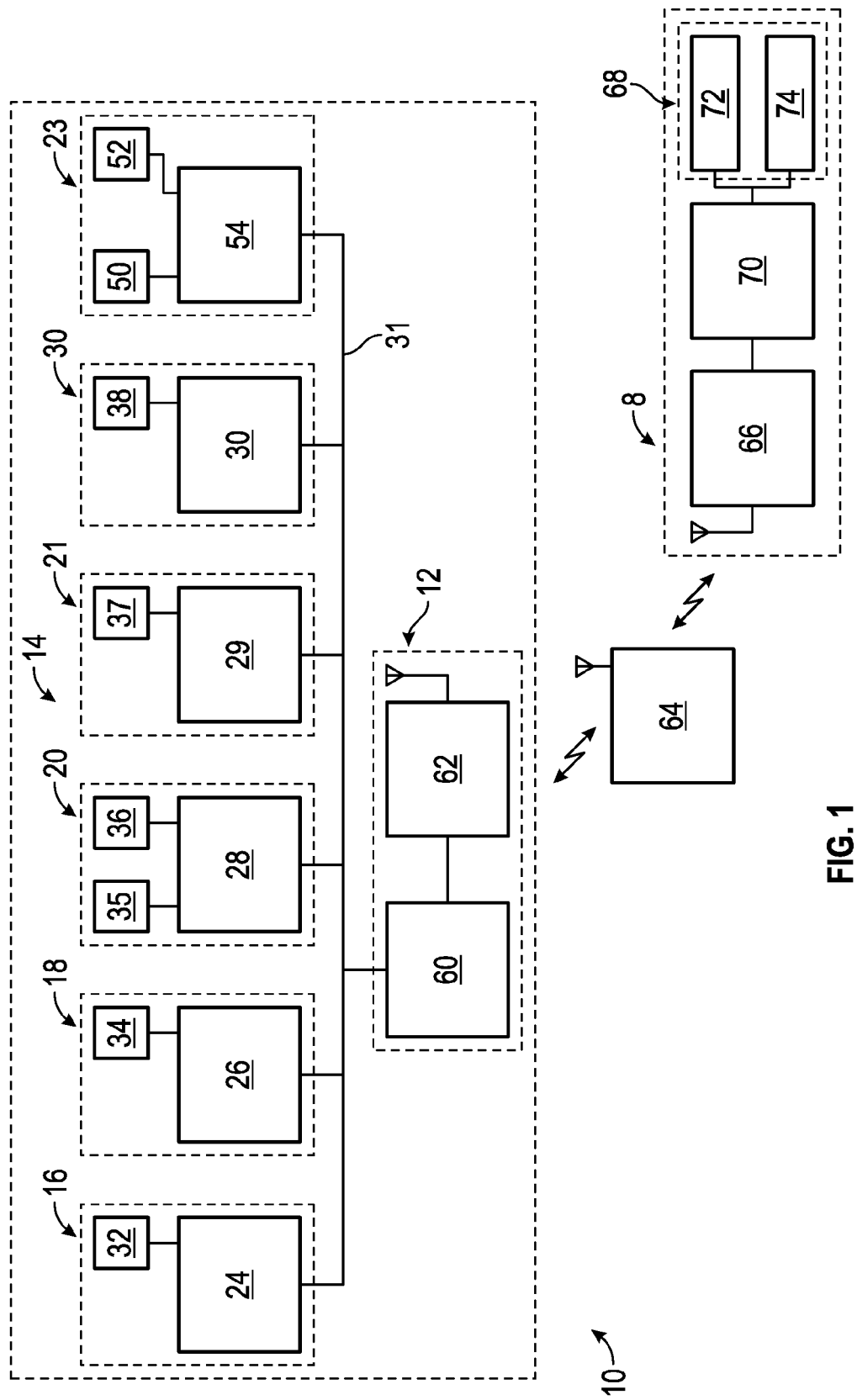
FIG. 1 is a functional block diagram illustrating a vehicle that includes a notification system for use with a remote device in accordance with various embodiments.

With reference to FIG. 1, a vehicle 10 includes a notification system 12 for notifying communicating with a device 8 of an operator of the vehicle 10 regarding one or more systems 14 of the vehicle 10. In one example, the vehicle 10 includes a propulsion system 16, a body system 18, an interior system 20, an entertainment system 21, a heating and cooling system 22 and a user interface system 23. It should be noted that the systems 14 associated with the vehicle 10 described herein are merely exemplary, as the vehicle 10 may include any number of systems and subsystems, along with any configuration of systems. Each of the exemplary systems 14 includes a control module, such as a propulsion control module 24, a body control module 26, an interior control module 28, an entertainment control module 29 and a heating and cooling control module 30. Each of the control modules 24-30 are in communication with the notification system 12 and the user interface system 23 over an interconnection architecture 31, or arrangement that facilitates transfer of data, commands, power, etc. As can be appreciated, the sub-modules shown in FIG. 1 can be combined and/or further partitioned to similarly control systems 14 of the vehicle 10. Each of the control modules 24-30 generate control signals to control features of the particular system 16-22 associated with the vehicle 10. These control signals may be based on responses to one or more conditions observed by one or more sensors 32-38 associated with the system 16-22 and/or upon receipt of control signals from the notification system 12.

In one of various embodiments, the propulsion control module 24 generates control signals that control the various systems associated with propulsion system 16 for the movement and operation of the vehicle 10, including, but not limited to, a control signal for the operation of a propulsion device, an ignition system, a suspension system, a steering system, a brake system and an exhaust system. The control signals generated by the propulsion control module 24 may be based on signals received from one or more sensors 32, data received from the interconnection architecture 31 or data received from other modules associated with the vehicle 10.

The sensors 32 observe conditions of the propulsion system 16, and generate sensors signals based on the observed conditions. In one example, the sensors 32 observe various conditions of the propulsion system 16, including, but not limited to: a state of charge of a battery, a parasitic current drawn from the battery, an oil level of a propulsion device, a fuel level of the propulsion device, a status of a key associated with the ignition system (in vehicle 10), a park brake status (off or on) of the brake system, a power mode status (off, accessory, on), a gear status of a transmission, an oil level of the transmission, a temperature of the transmission, an engine air cleaner condition, an oxygen sensor status of an exhaust system, a catalytic converter life remaining status of the exhaust system, a brake fluid level of a brake system, a brake pad life of one or more brake pads associated with the brake system, a driveline status (two-wheel drive, all-wheel drive, four-wheel drive), axle and transfer case fluid level, axle and transfer case fluid life, fuel door and fuel cap status (open, closed), a level of the suspension system (inflated, deflated), an incline of the vehicle 10, a tire pressure of one or more tires associated with the suspension system, a wiper fluid level of a windshield wiper system, a movement authorization status (movement of vehicle 10 authorized or movement unauthorized), a status of a steering column of the steering system (locked or unlocked) and a position of the steering column. The sensors 32 communicate the sensor signals to the propulsion control module 24. As will be discussed, the notification system 12 retrieves these sensor signals as sensor data from the propulsion control module 24 over the interconnection architecture 31.

In one exemplary embodiment, the body control module 26 generates control signals that control the operation of the various systems associated with the body system 18 of the vehicle 10, including, but not limited to, one or more door lock control signals to a door lock system for locking or securing one or more doors of the vehicle 10 to a body associated with the vehicle 10, one or more unlatch control signals to one or more door latches associated with an opening system for opening a door, cargo access structure or liftgate secured to the body of the vehicle, a lock control signal to a cargo access structure or liftgate lock system for locking or securing the cargo access structure or liftgate to the body, a power actuator control signal to a cargo access structure or liftgate power actuator for opening and closing the cargo access structure or liftgate relative to the body of the vehicle, a mirror power actuator control signal to a mirror power actuator for moving an external mirror relative to a body of the vehicle 10. The control signals generated by the body control module 26 may be based on signals received from one or more sensors 34, data received from the interconnection architecture 31 or data received from other modules associated with the vehicle 10.

The sensors 34 observe conditions of the body system 18, and generate sensor signals based on the observed conditions. In one example, the conditions the sensors 34 observe include, but are not limited to: a door lock status (locked or unlocked), a cargo access structure or liftgate lock status (locked or unlocked), a rain status (raining or not raining), a door status (opened or closed), a cargo access structure or liftgate status (opened or closed), door latch status (latched or unlatched), cargo access structure or liftgate latch status (latched or latched), a trailering status (trailer attached or not attached to the vehicle 10), tire jack status (in vehicle 10 or outside of vehicle 10), articulated running board status (extended or retracted), a security status (security breached or vehicle secure) and a child security lock status (child security on to prevent child from opening door). The sensors 34 communicate the sensor signals to the body control module 26. As will be discussed, the notification system 12 retrieves these sensor signals as sensor data from the body control module 26 over the interconnection architecture 31.

In another one of various embodiments, the interior control module 28 generates control signals that control the operation of the various systems associated with the interior system 20 of the vehicle 10, including, but not limited to, one or more seat control signals for adjusting a position of a powered seat, one or more seat fold control signals for actuating an actuator to fold or unfold a folding seat, one or more control signals to deploy an airbag system of the interior system 20, one or more driver control signals to adjust a seat to a known position for a particular driver of the vehicle 10, one or more sunroof control signals to an actuator 35 to open or close a sunroof associated with the vehicle 10, one or more shade control signals to open or close a sunshade associated with the vehicle 10, one or more light control signals to turn on or turn off one or more interior lights, etc. The control signals generated by the interior control module 28 may be based on signals received from one or more sensors 36, data received from the interconnection architecture 31 or data received from other modules associated with the vehicle 10.

Generally, the sensors 36 observe conditions of the interior system 20, and generate sensors signals based on the observed conditions. In one example, the conditions the sensors 36 observe include, but are not limited to: an occupant status (seat occupied or unoccupied), a foldable seat status (folded or unfolded), a seat position status (amount of incline), a sunroof status (open or closed), a sunshade status (open or closed), a child safety seat status (child safety seat secured to child safety seat latches), a rear cargo cover status (open or closed), an interior light status (light on or light off), a valet mode status (on or off), a glove box or stowage compartment status (open or closed), an auxiliary power outlet status (in use or not in use) and a cabin air filter condition (good or replace). The sensors 36 communicate the sensor signals to the interior control module 28. As will be discussed, the notification system 12 retrieves these sensor signals as sensor data from the interior control module 28 over the interconnection architecture 31.

In one of various embodiments, the entertainment control module 29 generates control signals that control the operation of the various systems associated with the entertainment system 21 of the vehicle 10, including, but not limited to, one or more radio control signals for changing a radio station and/or adjusting a radio station volume, one or more portable electronic device control signals for obtaining data from a portable electronic device, one or more control signals for controlling the display of a display device associated with the entertainment system 21, one or more control signals for controlling a navigation device of the entertainment system 21, one or more control signals for controlling a communications system of the entertainment system 21, such as controlling a Bluetooth connection, wireless connection, etc. The control signals generated by the entertainment control module 29 may be based on signals received from one or more sensors 37, data received from the interconnection architecture 31 or data received from other modules associated with the vehicle 10.

The sensors 37 observe conditions of the entertainment system 21, and generate sensors signals based on the observed conditions. In one example, the conditions the sensors 37 observe include, but are not limited to: a radio status (on or off), a radio presence (in vehicle 10 or outside of vehicle 10), a portable electronic device status (connected or disconnected), a disc presence (in disc drive or out of disc drive), a disc title, a communication status (connected or disconnected), a quantity of incoming communication messages and a clock setting and time zone. The sensors 37 communicate the sensor signals to the entertainment control module 29. As will be discussed, the notification system 12 retrieves these sensor signals as sensor data from the entertainment control module 29 over the interconnection architecture 31.

The heating and cooling control module 30 generates control signals that control the operation of the various systems associated with the heating and cooling system 22 of the vehicle 10, including, but not limited to, one or more control signals for adjusting a heat or cool air output by a blower, one or more control signals to activate a heater, one or more control signals to activate an air conditioning unit, one or more control signals to activate an engine block heater, one or more control signals to activate an engine cooling fan, etc. The control signals generated by the heating and cooling control module 30 may be based on signals received from one or more sensors 38, data received from the interconnection architecture 31 or data received from other modules associated with the vehicle 10.

The sensors 38 observe conditions of the heating and cooling system 22, and generate sensors signals based on the observed conditions. In one example, the conditions the sensors 38 observe include, but are not limited to: a passenger cabin temperature, an exterior temperature, an engine cooling fan status (operational or not operational), a passenger cabin temperature setting, a passenger cabin heating and cooling status (on or off) and a passenger cabin heating and cooling type (heat or air conditioning). The sensors 38 communicate the sensor signals to the heating and cooling control module 30. As will be discussed, the notification system 12 retrieves these sensor signals as sensor data from the heating and cooling control module 30 over the interconnection architecture 31.

The user interface system 23 provides the operator or an occupant of the vehicle 10 to interface with the various systems 14 of the vehicle 10. The user interface system 23 includes a user input device 50, a display 52 and a user interface control module 54. The user input device 50 is any suitable device capable of receiving user input, including, but not limited to, a keyboard, a microphone, a touchscreen layer associated with the display 52, or other suitable device to receive data and/or commands from the user. Of course, multiple user input devices 50 can also be utilized. The display 52 comprises any suitable technology for displaying information, including, but not limited to, a liquid crystal display (LCD), organic light emitting diode (OLED), plasma, or a cathode ray tube (CRT). The user interface control module 54 is in communication with the user input device 50, the display 52 and the notification system 12 via the interconnection architecture 31. As will be discussed in greater detail herein, the user interface control module 54 receives user input data from the user input device 50 regarding user preferences for the notification system 12 (which can be displayed on the display 52), and provides this user input data regarding user preferences to the notification system 12.

The notification system 12 is in communication with the systems 14 and the user interface control module 54 over the interconnection architecture 31. In one example, the notification system 12 includes a control module 60 and a vehicle communication device 62. As will be discussed in detail with regard to FIG. 2, the control module 60 receives data from the systems 14 and the user interface control module 54 over the interconnection architecture 31, and based on the sensor data and user preferences, sets a notification for the vehicle communication device 62 to transmit to the device 8 to notify the user of one or more statuses of one or more of the systems 14 of the vehicle 10. In addition, the control module 60 receives a remote action from the device 8 via the vehicle communication device 62, and sets control signals for one or more of the control modules 24-30 of the systems 14 based on the received action. It should be noted that the illustration of the control module 60 in the vehicle 10 is merely exemplary as the control module 60 can be implemented with the entertainment system 21 and/or as part of an infotainment system associated with the vehicle 10. In addition, the control module 60 could be located remote from the vehicle 10, and could be implemented as a cellular phone, tablet, portable communication device or web-based application that can receive inputs from a remote user and transmit those settings to the vehicle 10.

The vehicle communication device 62 comprises any suitable system for receiving data from and transmitting data to the device 8. For example, the vehicle communication device 62 may include a radio configured to receive data transmitted by modulating a radio frequency (RF) signal from a remote station 64 as is well known to those skilled in the art. For example, the remote station 64 may be part of a cellular telephone network and the data may be transmitted according to the long-term evolution (LTE) standard. The vehicle communication device 62 also transmits data to the remote station 64 to achieve bi-directional communications. However, other techniques for transmitting and receiving data may alternately be utilized. For example, the vehicle communication device 62 may achieve bi-directional communications with the device 8 over Bluetooth or by utilizing a Wi-Fi standard, i.e., one or more of the 802.11 standards as defined by the Institute of Electrical and Electronics Engineers ("IEEE"), as is well known to those skilled in the art. The vehicle communication device 62 may be separate from or integral with the entertainment system 21. In addition, the vehicle communication device 62 may be configured to encode data or generate encoded data. The encoded data generated by the vehicle communication device 62 may be encrypted. A security key may be utilized to decrypt and decode the encoded data, as is appreciated by those skilled in the art. The security key may be a "password" or other arrangement of data that permits the encoded data to be decrypted. Alternatively, the remote station 64 may implement security protocols to ensure that communication takes place between the appropriate vehicles 10 and devices 8.

The device 8 is in communication with the vehicle 10 to receive the data from the vehicle communication device 62 and to transmit data to the vehicle communication device 62. The device 8 is any suitable electronic device external to the vehicle 10, including, but not limited to, a hand-held portable electronic device, such as a tablet computing device, mobile or smart phone, personal digital assistant; a laptop computing device; a desktop computing device; etc. The device 8 includes a device communication component 66, a device user interface 68 and a device control module 70. The device communication component 66 comprises any suitable system for receiving data from and transmitting data to the vehicle communication device 62. In one example, the device communication component 66 may include a radio configured to receive data transmitted by modulating a radio frequency (RF) signal from the remote station 64. The device communication component 66 also transmits data to the remote station 64 to achieve bi-directional communications. However, other techniques for transmitting and receiving data may alternately be utilized. For example, the device communication component 66 may achieve bi-directional communications with the vehicle communication device 62 over Bluetooth or by utilizing a Wi-Fi standard, i.e., one or more of the 802.11 standards as defined by the Institute of Electrical and Electronics Engineers ("IEEE"), as is well known to those skilled in the art. The device communication component 66 may also be configured to encode data or generate encoded data. The encoded data generated by the device communication component 66 may be encrypted. A security key may be utilized to decrypt and decode the encoded data, as is appreciated by those skilled in the art. The security key may be a "password" or other arrangement of data that permits the encoded data to be decrypted.

The device user interface 68 allows the user of the device 8 to interface with the device 8. In one example, the device user interface 68 includes a user input device 72 and a display 74. The user input device 72 is any suitable device capable of receiving user input, including, but not limited to, a keyboard, a microphone, a touchscreen layer associated with the display 74, or other suitable device to receive data and/or commands from the user. Of course, multiple user input devices 72 can also be utilized. The display 74 comprises any suitable technology for displaying information, including, but not limited to, a liquid crystal display (LCD), organic light emitting diode (OLED), plasma, or a cathode ray tube (CRT).

The device control module 70 is in communication with the device communication component 66 and the device user interface 68 over a suitable interconnection architecture or arrangement that facilitates transfer of data, commands, power, etc. As will be discussed, the device control module 70 receives input from the device user interface 68 and sets data for transmission by the device communication component 66 to the vehicle 10 based on the input from the device user interface 68. The device control module 70 also receives data from the device communication component 66 and sets this data as output for display on the display 74 of the device user interface 68. Thus, the device control module 70 enables two way data transfer with the vehicle 10 and enables a user remote from the vehicle 10 to interface with the systems 14 of the vehicle 10.

Figure 2:
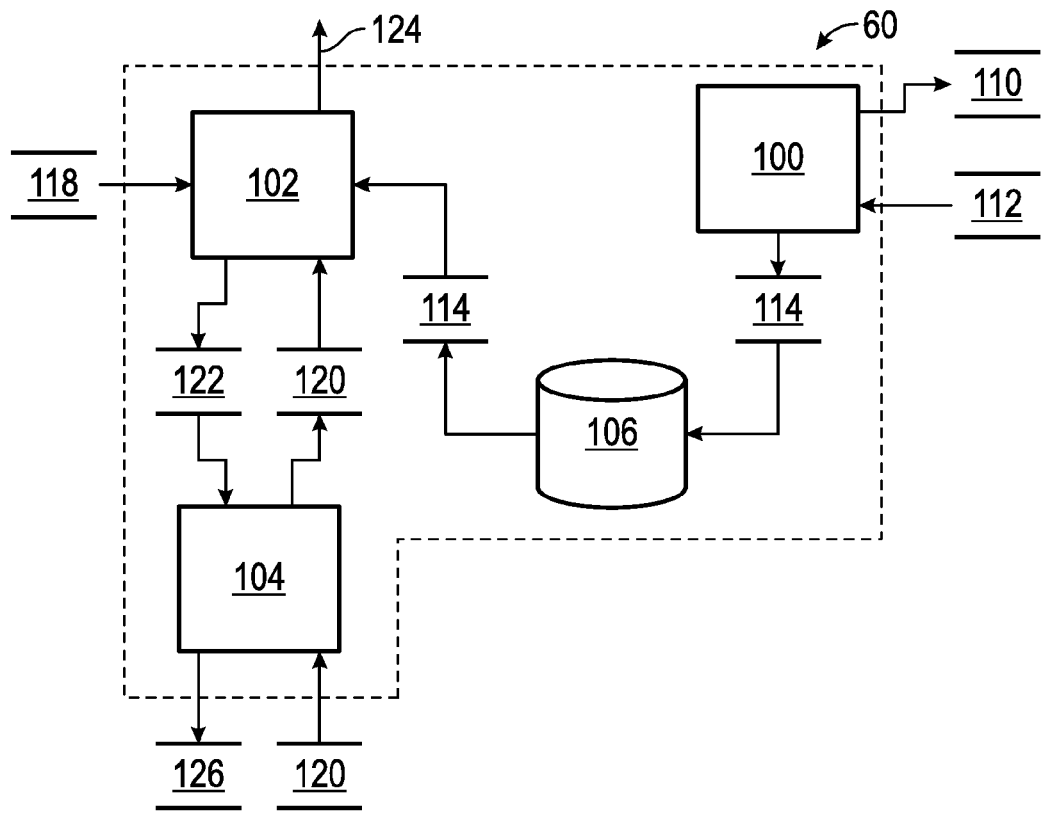
FIG. 2 is a dataflow diagram illustrating a control system of the notification system in accordance with various embodiments.

Referring now to FIG. 2 and with continued reference to FIG. 1, a dataflow diagram illustrates various embodiments of the control module 60 of the notification system 12. Various embodiments of the control module 60 according to the present disclosure can include any number of sub-modules embedded within the control module 60. As can be appreciated, the sub-modules shown in FIG. 2 can be combined and/or further partitioned to similarly generate control signals to one or more of the systems 14 of the vehicle 10 and/or generate notification data for transmission to the device 8. Inputs to the control module 60 may be sensed from the vehicle 10 (FIG. 1), received from other control modules (not shown) within the vehicle 10, and/or determined/modeled by other sub-modules (not shown) within the control module 60. In various embodiments, the control module 60 can include a user interface (UI) control module 100, a notification control module 102, a communication control module 104 and a settings datastore 106.

The settings datastore 106 stores the various settings for notifications provided by the operator of the vehicle 10. For example, the settings datastore 106 stores one or more preferences for notification of the operator of the vehicle 10. In various embodiments, one or more of the preferences for notification are predefined (e.g., factory set); and one or more of the preferences for notification are user-configured. As can be appreciated, the settings datastore 106 can be any non-volatile memory type that stores the information over the repeated use of the vehicle 10.

The UI control module 100 generates user interface data 110 that may be used by the display 52 to display a user interface that may include a configuration menu for configuring various preferences for notification. For example, the configuration menu can comprise selectable items and/or text input items for configuring the various notifications available based on the sensor data obtained from the various sensors 32-38 of the vehicle 10 (e.g., a list of the available notifications, including, but not limited to, fuel level, oil level, rain status, sunroof status, sunshade status, radio status, etc. that are associated with conditions observed by the sensors 32-38 of the systems 14 of the vehicle 10).

The UI control module 100 can receive as input user input data 112 based on a user's interaction with the user interface. The user input data 112 comprises a desired preference 114 for the notification system 12. The UI control module 100 stores the user input data 112 as a preference 114 in the settings datastore 106.

The notification control module 102 receives as input sensor data 118 for example, from the sensors 38-32 of the systems 14 of the vehicle 10 and remote action data 120. It should be noted that the sensor data 118 can be received from other modules associated with the vehicle 10. When the sensor data 118 is received, the notification control module 102 retrieves from the settings datastore 106, the preference 114. Based on the preference 114 associated with the sensor data 118, the notification control module 102 sets notification data 122 for use by the communication control module 104. In one example, if the preference 114 indicates the operator wishes to receive a notification about the particular condition observed by one or more of the sensors 32-38, the notification control module 102 generates notification data 122 that includes a notification of the condition observed by the particular sensor 32-38 for the communication control module 104.

The notification control module 102 also outputs one or more control signals 124 for one or more of the control modules 24-30 of the systems 14 based on the receipt of remote action data 120. The remote action data 120 is received from the communication control module 104, and comprises remote user input for an action to be performed at the vehicle 10 based on the user's interaction with the device 8. In one example, the one or more control signals 124 comprise one or more control signals to actuate a component associated with one or more of the systems 14. For example, the one or more control signals 124 can comprise a control signal 124 to actuate an actuator to fold or unfold a folding seat, a control signal 124 to adjust a seat to a known position for a particular driver of the vehicle 10, a control signal 124 to open or close a sunroof associated with the vehicle 10, a control signal 124 to open or close a sunshade associated with the vehicle 10, a control signal 124 to a door lock system for locking or securing one or more doors of the vehicle 10 to a body associated with the vehicle 10, a control signal 124 to one or more door latches associated with an opening system for opening a door, cargo access structure or liftgate secured to the body of the vehicle, a control signal 124 to a cargo access structure or liftgate lock system for locking or securing the cargo access structure or liftgate to the body, a control signal 124 to a cargo access structure or liftgate power actuator for opening and closing the cargo access structure or liftgate relative to the body of the vehicle, a control signal 124 to a mirror power actuator for moving an external mirror relative to a body of the vehicle 10, etc.

The communication control module 104 receives as input notification data 122 and remote action data 120. Upon receipt of the notification data 122, the communication control module 104 outputs a notification 126 to the device 8 using the vehicle communication device 62. The notification 126 comprises the notification data 122 in a suitable format to be received by the device 8 and/or remote station 64. Thus, the notification 126 may include, but is not limited to, a text message, email, graphical representation, auditory message, etc. The communication control module 104 sets the received remote action data 120 for the notification control module 102. The remote action data 120 is received by the communication control module 104 over the vehicle communication device 62.

Figure 3:
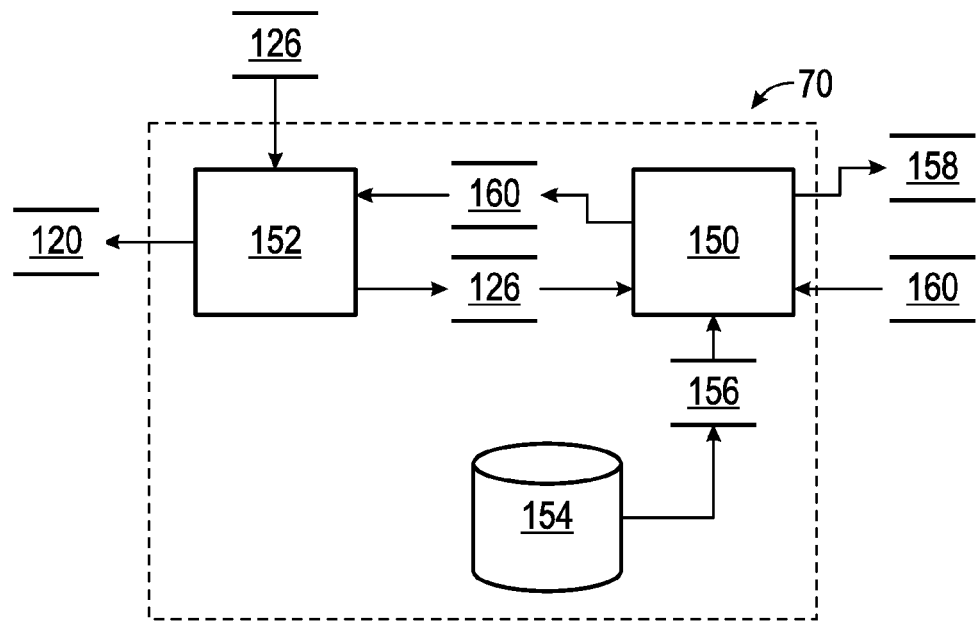
FIG. 3 is a dataflow diagram illustrating a control system of the remote device in accordance with various embodiments.

Referring now to FIG. 3 and with continued reference to FIG. 1, a dataflow diagram illustrates various embodiments of the device control module 70 associated with the device 8. Various embodiments of the device control module 70 according to the present disclosure can include any number of sub-modules embedded within the device control module 70. As can be appreciated, the sub-modules shown in FIG. 3 can be combined and/or further partitioned to similarly generate data for transmission to the vehicle 10. Inputs to the device control module 70 may be received from other control modules (not shown) within the device 8, and/or determined/modeled by other sub-modules (not shown) within the device control module 70. In various embodiments, the device control module 70 can include a remote user interface (UI) control module 150, a remote communication control module 152 and a response datastore 154.

The response datastore 154 stores the various actions for responses to notifications 126 received by the device 8. For example, the response datastore 108 stores one or more actions 156 in response to notifications 126 for the user of the device 8 to select. In various embodiments, one or more of the actions 156 in response to the notifications 126 are predefined (e.g., factory set); and one or more of the actions 156 in response to the notifications 126 are user-configured. As can be appreciated, the response datastore 154 can be any non-volatile memory type that stores the information.

The remote UI control module 150 generates remote user interface data 158 that may be used by the display 74 to display the notification 126 and one or more actions 156 for responding to the notifications 126. For example, the remote user interface data 158 can display the notification 126 and selectable items and/or text input items for actions 156 available based on the notifications 126 (e.g., a list of the available responses). Note that not all notifications 126 need necessarily include actions 156 in response to the notifications 126. The remote UI control module 150 receives as input remote user input data 160 based on a user's interaction with the device user interface 68. The remote user input data 160 comprises a desired action 156 in response to the notification 126.

The remote communication control module 152 receives as input the notification 126 and remote user input data 160. Upon receipt of the remote user input data 160, the remote communication control module 162 outputs remote action data 120 to the device 8 using the vehicle communication device 62. The remote action data 120 comprises the remote user input data 160 in a suitable format to be received by the vehicle 10 and/or the remote station 64. The communication control module 104 sets the received notification 126 for the remote UI control module 150. The notification 126 is received by the remote communication control module 152 over the device communication component 66.

Figure 4:
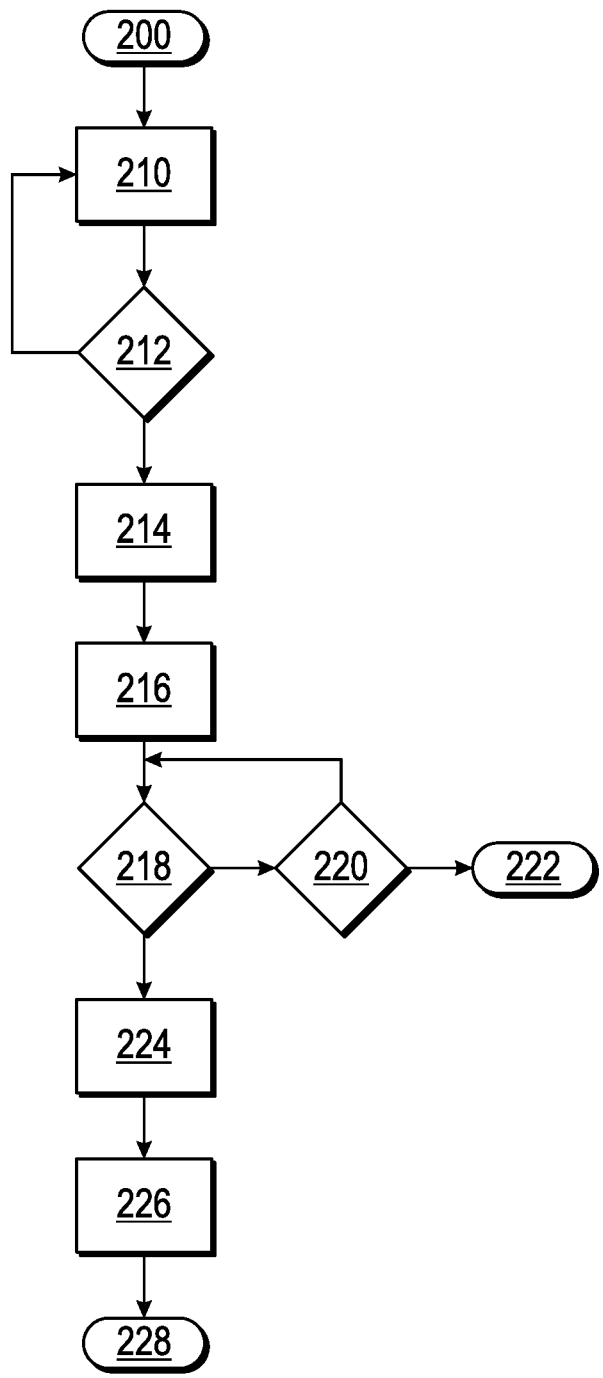
FIG. 4 is a flowchart illustrating a control method of the notification system in accordance with various embodiments.

Referring now to FIG. 4, and with continued reference to FIGS. 1 and 2, a flowchart illustrates a control method that can be performed by the control module 60 accordance with the present disclosure. As can be appreciated in light of the disclosure, the order of operation within the method is not limited to the sequential execution as illustrated in FIG. 4, but may be performed in one or more varying orders as applicable and in accordance with the present disclosure. As can further be appreciated, one or more steps of the method may be added or removed without altering the spirit of the method.

The method may begin at 200. Sensor data 118 is received from one or more of the sensors 32-38 at 210. At 212, the method determines, based on the preference 114, if one or more notifications 126 are to be transmitted to the device 8. If one or more notifications 126 are to be transmitted to the device 8, then at 214, the one or more notifications 126 are generated. Otherwise, the method loops. At 216, the one or more notifications 126 are transmitted to the device 8 and/or the remote station 64 and a timer is set to zero. At 218, the method determines if remote action data 120 has been received in response to the one or more notifications 126. If remote action data 120 has not been received, at 220, the method determines if a predetermined time delay has expired, such that the timer is greater than a predetermined time. If true, then the method ends at 222.

Otherwise, if remote action data 120 is received at 218, then the method generates one or more control signals 124 in response to the remote action data 120 at 224. The one or more control signals 124 are output to the respective one or more systems 14 associated with the vehicle 10 at 226. Then, the method ends at 228.

In one example, the sensor data 118 received by the notification control module 102 comprises a rain status observed by one of the sensors 34 associated with the body system 18 of the vehicle 10. The notification control module 102 also receives a sunroof status observed by one or more of the sensors 36 of the interior system 20. The preference 114 retrieved by the notification control module 102 may indicate that if the rain status is true and the sunroof is open, the user wishes to be notified. Based on the receipt of the sensor data 118 and the preference 114, the notification control module 102 sets notification data 122 for the communication control module 104. The communication control module 104 in turn outputs the notification 126 to the device 8 and/or the remote station 64 that indicates that the rain status is true and the sunroof is open.

Upon receipt of the notification 126 by the device communication component 66, the remote communication control module 152 sets the notification 126 for the remote UI control module 150. Upon receipt of the notification 126, the remote UI control module 150 queries the response datastore 154 for one or more actions 156 associated with the notification 126, such as, close the sunroof or ignore. The remote UI control module 150 then outputs the one or more actions 156 along with the notification 126 for display on the display 74 of the device 8. Upon receipt of remote user input data 160 (e.g. close the sunroof), the remote UI control module 150 sets remote user input data 160 for the remote communication control module 152. The remote communication control module 152, using the device communication component 66, transmits the remote action data 120 to the vehicle communication device 62.

Upon receipt of the remote action data 120, the communication control module 104 sets the remote action data 120 for the notification control module 102. Based on the remote action data 120, the notification control module 102 generates one or more control signals to perform the requested action (e.g. close the sunroof). In this example, the one or more control signals are output to the interior control module 28 to actuate the actuator 35 to close the sunroof of the vehicle 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method of notifying a user of a condition of a vehicle, comprising:
   receiving sensor data from one or more sensors associated with one or more systems of the vehicle, the one or more sensors observing conditions associated with the one or more systems of the vehicle;
   receiving a preference for available notifications as input to a user interface onboard the vehicle, the available notifications based on the sensor data received from the one or more sensors;
   based on the preference and the sensor data, generating, by a processor of the vehicle, at least one notification at the vehicle;
   communicating the at least one notification from the vehicle directly to a device of the user;
   receiving, by a processor of the device of the user, the at least one notification;
   generating, by the processor of the device of the user, at least one action based on the received at least one notification from the vehicle;
   displaying the at least one notification and the at least one action on a display associated with the device of the user;
   receiving, by the processor of the device of the user, a desired action as input in response to the displaying;
   transmitting the desired action, by the processor of the device of the user, to the vehicle; and
   outputting one or more control signals to the one or more systems of the vehicle by the processor of the vehicle based on the desired action.

2. The method of claim 1, wherein generating the at least one action comprises:
   based on the at least one notification received by the device, retrieving the at least one action from a response datastore for responding to the at least one notification.

3. The method of claim 2, wherein the at least one notification comprises a notification of a rain status and a sunroof open status, the at least one action comprises a plurality of actions, and the first action is a close sunroof action and the second action is an ignore action.

4. The method of claim 1, wherein the device of the user is a hand-held portable electronic device.

5. A notification system for notifying a user of a condition associated with a system of a vehicle, comprising:
   a sensor that observes a condition associated with the system of the vehicle and generates sensor data based on the observed condition;
   a user input device onboard the vehicle that receives a preference for an available notification from the user, the available notification based on the sensor data;
   a communication device onboard the vehicle to communicate a notification directly to a device associated with the user; and
   a control module onboard the vehicle having a processor that generates the notification for communication by the communication device based on the preference and the sensor data,
   the device associated with the user that includes a processor, and the processor of the device associated with the user:
   receives the notification;
   generates at least one action based on the received notification;
   displays the received notification and the at least one action on a display of the device associated with the user,
   receives as input a desired action based on the display of the received notification and the at least one action; and
   transmits the desired action to the vehicle,
   wherein the control module receives the desired action and generates one or more control signals for the system of the vehicle based on the desired action.

6. The system of claim 5, wherein the sensor observes a condition associated with at least one of a powertrain system, a body system, an interior system, an entertainment system and a heating and cooling system.

7. The system of claim 5, wherein the device associated with the user retrieves the at least one action from a response datastore based on the notification.

8. The system of claim 5, wherein the desired action comprises a selected action for the system of the vehicle in response to the notification.

9. A method of notifying a user of a condition of a vehicle, comprising:
   providing a user device in communication with the vehicle, the user device having a user device processor, a display and a user input device;
   receiving sensor data from one or more sensors associated with one or more systems of the vehicle, the one or more sensors observing conditions associated with the one or more systems of the vehicle;
   receiving a preference for available notifications as input to a user interface onboard the vehicle, the available notifications based on the sensor data received from the one or more sensors;
   based on the preference and the sensor data, generating, by a processor of the vehicle, at least one notification at the vehicle;
   communicating the at least one notification from the vehicle directly to the user device;
   receiving, by the user device processor, the at least one notification;
   displaying the at least one notification on the display of the user device;
   generating, by the user device processor, one or more actions based on the received at least one notification from the vehicle;
   displaying the one or more actions on the display of the user device;
   receiving at least one user input to the user input device of the user device in response to the display of the at least one notification and the one or more actions;
   transmitting the received at least one user input to the vehicle; and
   generating one or more control signals for the one or more systems of the vehicle by the processor of the vehicle based on the receipt of the at least one user input from the user device.

10. The method of claim 9, wherein generating one or more control signals further comprises:
    generating one or more control signals to actuate an actuator associated with one of the one or more systems of the vehicle.

11. The method of claim 9, wherein the user device is a hand-held portable electronic device.

12. The method of claim 9, wherein communicating the at least one notification to the user device further comprises:
   communicating the at least one notification to a remote station in communication with the user device.

13. The method of claim 9, wherein the one or more sensors observe conditions associated with one or more of a powertrain system, a body system, an interior system, an entertainment system and a heating and cooling system of the vehicle.

14. The method of claim 9, wherein the user interface of the vehicle includes a vehicle display and a vehicle user input device, and the preference is received from user input to the vehicle user input device.

* * * * *